United States Patent
Manoria (10) Patent No.: US 10,885,727 B2
(45) Date of Patent: Jan. 5, 2021

(54) VEHICULAR IMPLEMENTED INSPECTION

(71) Applicant: INTERNATIONAL BUSINESS MACHINES CORPORATION, Armonk, NY (US)

(72) Inventor: Vikas K. Manoria, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 15/985,868

(22) Filed: May 22, 2018

(65) Prior Publication Data

US 2019/0362569 A1 Nov. 28, 2019

(51) Int. Cl.
| | | |
|---|---|---|
| *G07C 5/08* | (2006.01) | |
| *G06F 3/01* | (2006.01) | |
| *G06F 3/16* | (2006.01) | |
| *G06Q 10/00* | (2012.01) | |
| *G05D 1/02* | (2020.01) | |

(52) U.S. Cl.
CPC ......... *G07C 5/0808* (2013.01); *G05D 1/0214* (2013.01); *G06F 3/017* (2013.01); *G06F 3/167* (2013.01); *G06Q 10/20* (2013.01)

(58) Field of Classification Search
CPC ........ G06Q 40/08; G06Q 10/06; G06Q 30/06; G06Q 10/20; G06Q 30/0278; G06Q 30/0283; G06Q 40/00; B64C 2201/127; B64C 39/024; B64C 19/00; B64C 2201/12; B64C 2201/123; B64C 2201/14; B64C 2201/146

See application file for complete search history.

(56) References Cited

U.S. PATENT DOCUMENTS

| | | | |
|---|---|---|---|
| 7,889,931 B2 | 2/2011 | Webb et al. | |
| 8,005,684 B1 | 8/2011 | Cheng et al. | |
| 8,712,893 B1 | 4/2014 | Brandmaier et al. | |
| 8,818,572 B1 | 8/2014 | Tofte et al. | |
| 9,186,793 B1 * | 11/2015 | Meier | G05B 19/42 |
| 9,440,352 B2 * | 9/2016 | Meier | G05B 19/42 |
| 9,505,494 B1 | 11/2016 | Marlow et al. | |
| 9,898,558 B1 * | 2/2018 | Tofte | G06Q 40/08 |
| 10,313,148 B1 * | 6/2019 | Fields | H04L 12/282 |
| 10,607,084 B1 * | 3/2020 | Tang | G06T 7/70 |

(Continued)

FOREIGN PATENT DOCUMENTS

CN 106657909 5/2017

*Primary Examiner* — Ryan Rink
(74) *Attorney, Agent, or Firm* — Schmeiser, Olsen & Watts; William H. Hartwell (57) ABSTRACT

A method and system for automatically inspecting an apparatus is provided. The method includes receiving an initial set of software scripts for executing an autonomous inspection process with respect to an apparatus for inspection. A vehicle is directed to a specified geographical location associated with the apparatus for inspection. Hand gesture commands and voice commands of an individual associated with inspecting the apparatus are detected via audio and video retrieval devices of the vehicle and a specified distance is maintained between the vehicle and the individual. In response to the commands, an autonomous inspection process with respect to the apparatus for inspection is executed and a modified set of software scripts for executing future autonomous inspection processes with respect to additional apparatuses for inspection is generated.

14 Claims, 7 Drawing Sheets

(56) References Cited

U.S. PATENT DOCUMENTS

| | | | |
|---|---|---|---|
| 10,633,093 B2* | 4/2020 | Castillo-Effen | G05D 1/101 |
| 2003/0105728 A1 | 6/2003 | Yano et al. | |
| 2007/0083303 A1 | 4/2007 | O'Sullivan et al. | |
| 2008/0253613 A1* | 10/2008 | Jones | G06K 9/00335 |
| | | | 382/103 |
| 2013/0325775 A1* | 12/2013 | Sinyavskiy | G06N 20/00 |
| | | | 706/25 |
| 2017/0147991 A1* | 5/2017 | Franke | G06Q 30/0278 |
| 2017/0255198 A1* | 9/2017 | Rodriguez | G05D 1/0088 |
| 2018/0035606 A1* | 2/2018 | Burdoucci | B64C 39/024 |
| 2018/0147721 A1* | 5/2018 | Griffin | A47L 9/2894 |
| 2018/0247544 A1* | 8/2018 | Mustafic | H04W 36/0083 |
| 2018/0251219 A1* | 9/2018 | Taylor | G08G 5/0069 |
| 2018/0321692 A1* | 11/2018 | Castillo-Effen | B64C 39/024 |
| 2018/0375568 A1* | 12/2018 | De Rosa | H04W 72/04 |
| 2019/0161103 A1* | 5/2019 | Venkatasubramanian | |
| | | | B61L 27/0083 |
| 2019/0185161 A1* | 6/2019 | Eleryan | B64C 39/02 |
| 2019/0265705 A1* | 8/2019 | Zhang | G05D 1/0005 |
| 2020/0041560 A1* | 2/2020 | Schwartz | G06N 3/0454 |

* cited by examiner

VEHICULAR IMPLEMENTED INSPECTION

BACKGROUND

The present invention relates generally to a method for implementing a vehicular inspection process and in particular to a method and associated system for coordinating an autonomous inspection process with respect to an apparatus for inspection and generating associated software scripts for executing future autonomous inspection processes. The present invention is operable with respect to transportation inspection facilities for allowing users to determine an operability of a vehicle.

SUMMARY

A first aspect of the invention provides a vehicular implemented inspection improvement method comprising: receiving, by a processor of a vehicle, an initial set of software scripts for executing an autonomous inspection process with respect to an apparatus for inspection; directing, by the processor, the vehicle to a specified geographical location associated with the apparatus for inspection, wherein the vehicle comprises a video retrieval device for retrieving video data and an audio enabled device for retrieving and presenting audible signals; first detecting, by the processor via the video retrieval device, hand gesture commands of an individual associated with inspecting the apparatus for inspection; second detecting, by the processor via the audio enabled device, voice commands of the individual associated with inspecting the apparatus for inspection; maintaining, by the processor, a specified distance between the vehicle and the individual; executing in response to the hand gesture commands and the voice commands, by the processor executing the initial set of software scripts, the autonomous inspection process with respect to the apparatus for inspection; and generating, by the processor based on results of the executing, a modified set of software scripts for executing future autonomous inspection processes with respect to additional apparatuses for inspection.

A second aspect of the invention provides a computer program product, comprising a computer readable hardware storage device storing a computer readable program code, the computer readable program code comprising an algorithm that when executed by a processor of a vehicle implements a vehicular inspection improvement method, the method comprising: receiving, by the processor, an initial set of software scripts for executing an autonomous inspection process with respect to an apparatus for inspection; directing, by the processor, the vehicle to a specified geographical location associated with the apparatus for inspection, wherein the vehicle comprises a video retrieval device for retrieving video data and an audio enabled device for retrieving and presenting audible signals; first detecting, by the processor via the video retrieval device, hand gesture commands of an individual associated with inspecting the apparatus for inspection; second detecting, by the processor via the audio enabled device, voice commands of the individual associated with inspecting the apparatus for inspection; maintaining, by the processor, a specified distance between the vehicle and the individual; executing in response to the hand gesture commands and the voice commands, by the processor executing the initial set of software scripts, the autonomous inspection process with respect to the apparatus for inspection; and generating, by the processor based on results of the executing, a modified set of software scripts for executing future autonomous inspection processes with respect to additional apparatuses for inspection.

A third aspect of the invention provides a vehicle comprising a processor coupled to a computer-readable memory unit, the memory unit comprising instructions that when executed by the processor executes a vehicular implemented inspection improvement method comprising: receiving, by the processor, an initial set of software scripts for executing an autonomous inspection process with respect to an apparatus for inspection; directing, by the processor, the vehicle to a specified geographical location associated with the apparatus for inspection, wherein the vehicle comprises a video retrieval device for retrieving video data and an audio enabled device for retrieving and presenting audible signals; first detecting, by the processor via the video retrieval device, hand gesture commands of an individual associated with inspecting the apparatus for inspection; second detecting, by the processor via the audio enabled device, voice commands of the individual associated with inspecting the apparatus for inspection; maintaining, by the processor, a specified distance between the vehicle and the individual; executing in response to the hand gesture commands and the voice commands, by the processor executing the initial set of software scripts, the autonomous inspection process with respect to the apparatus for inspection; and generating, by the processor based on results of the executing, a modified set of software scripts for executing future autonomous inspection processes with respect to additional apparatuses for inspection.

The present invention advantageously provides a simple method and associated system capable of analyzing objects for users.

DETAILED DESCRIPTION

Figure 1:
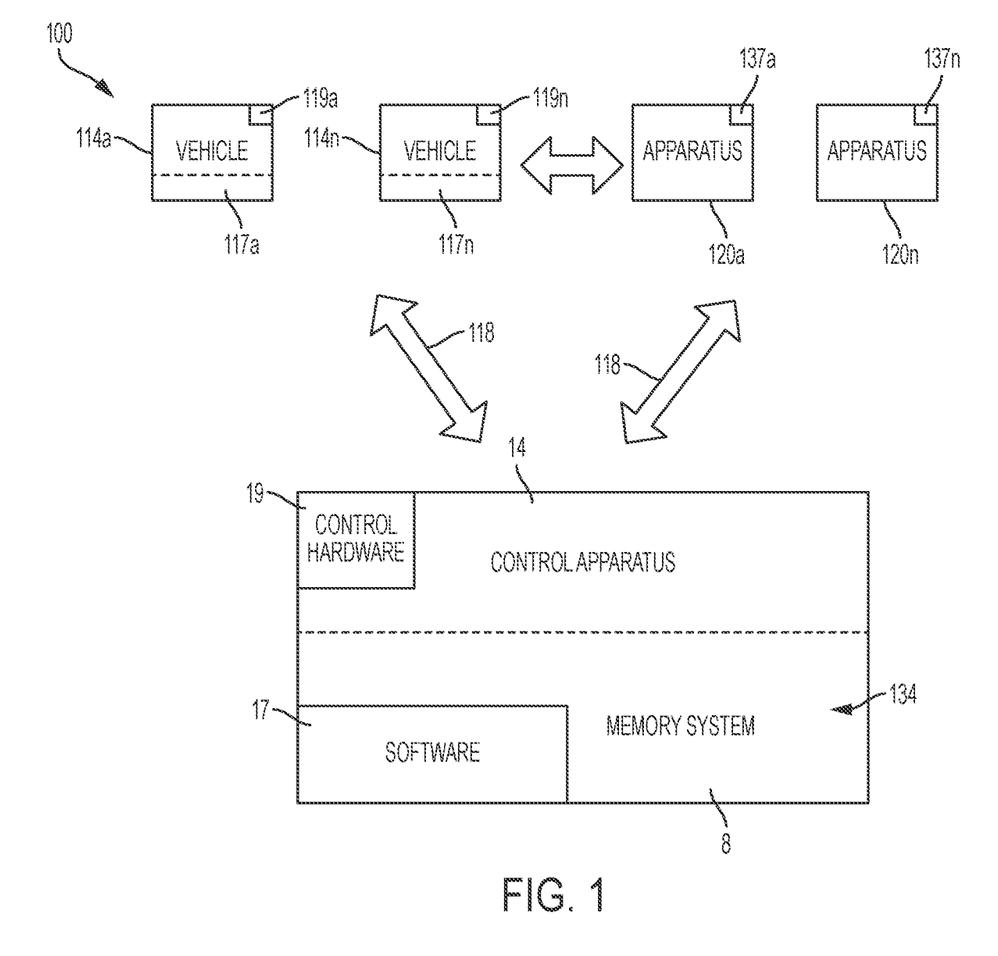
FIG. 1 illustrates a system for implementing an autonomous inspection improvement process with respect to apparatuses for inspection and generating associated software scripts for executing future autonomous inspection processes, in accordance with embodiments of the present invention.

FIG. 1 illustrates a system 100 for implementing an autonomous inspection improvement process with respect to apparatuses 120a . . . 120n for inspection and generating associated software scripts for executing future autonomous inspection processes, in accordance with embodiments of the present invention. Typical processes for analyzing objects for users include an inaccurate process with little flexibility. Coordinating multiple object analysis typically involves an unreliable process. Controlling and directing various analysis means with respect to objects in need of additional analysis may include a complicated process that may be time consuming and require a large amount of resources. Therefore, the autonomous inspection improvement process of FIG. 1 is executed via vehicles 114 . . . 114n. Apparatuses 120a . . . 120n may comprise any type of electro/mechanical apparatus (e.g., vehicle) requiring any type of inspection. For example, system 100 may enable a process for identifying a resale value for a used vehicle via usage of an autonomously controlled inspection vehicle. The autonomously controlled inspection vehicle may execute inspection drills (with respect to apparatuses 120a . . . 120n) via automated usage of Wi-Fi, cameras, speakers, microphones, memory retrieval, an x-ray generator, a smoke gas odor sensor, hand gesture recognition, and/or voice recognition capabilities enabled and comprised by the autonomously controlled inspection vehicle. The autonomously controlled inspection vehicle is enabled to execute: autonomous exterior and interior vehicle inspection drill processes, repair drill processes, new drill recording processes, and maintaining technician safe distance processes.

Vehicles 114 . . . 114n may include the following hardware/software equipment and capabilities:
1. A high definition (HD) video camera for retrieving HD videos and images.
2. An audio speaker and microphone.
3. An X-Ray generator and detector.
4. Wi-Fi capabilities.
5. A fire control smoke gas odor sensor.
6. Sensors for detecting and responding to hand gestures.
7. Sensors for detecting and responding to voice commands.
8. Hardware circuitry for running specialized script language (e.g., JavaScript) and managing light NoSQL DB platforms.
9. Control hardware circuitry and sensors for maintaining a safe distance between vehicles 114 . . . 114n and a technician (assisting with the inspection) during motion of vehicles 114 . . . 114n with respect to the performing the inspection process.
10. Hardware circuitry and memory for storing an initial set of software scripts for running autonomous exterior and interior vehicle inspection drills.
11. Hardware circuitry for executing inspection/repair drill software scripts and recording new inspection/repair drills for future usage. Vehicle inspection drills may include emissions inspections, safety inspections, repair inspections, resale inspections, trip readiness inspections, accident damage inspections, etc.

System 100 enables a process for coordinating complete a reliable, verifiable, and complete physical and electro/mechanical inspection of a vehicle in a timely and mistake free environment. The following inspection drills may be executed via system 100:
1. A vehicular exterior inspection drill (e.g., paint condition, dents, etc.).
2. An interior inspection drill (e.g., a condition of interior upholstery, dashboard cracks, interior lights out, etc.).
3. An under the hood inspection drill with respect to engine components.
4. A Wheel assembly inspection drill.
4. An engine, transmission, axle, and exhaust drill.
5. A computerized engine analysis drill executed via specialized computer hardware in communication with vehicles 114 . . . 114n. The specialized computer hardware is connected to various electrical connection points (e.g., exhaust diagnostic connectors) on an automobile for inspection such that the specialized computer hardware instructs the automobile's engine to execute specialized diagnostic tests. Feedback data from the specialized diagnostic tests is retrieved and a resulting electronic rating for each engine cylinder's compression in combination with additional vehicular functionality factors are determined and a diagnostic report is generated.

System 100 of FIG. 1 includes a control apparatus 14 in communication with vehicles 114a . . . 114n and apparatuses 120a . . . 120n via a wireless network 118. Apparatuses 120a . . . 120n (including interface hardware 137a . . . 137n) may include any type of device requiring inspection. For example, apparatuses 120a . . . 120n may include, inter alia, an automobile, a marine craft, etc. Vehicles 114a . . . 114n comprise software 117a . . . 117n including specialized software scripts for executing a process for implementing an autonomous inspection improvement process with respect to apparatuses for inspection. Vehicles 114a . . . 114n (i.e., control hardware 119a . . . 119n internal to vehicles 114a . . . 114n) and control apparatus 14 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, vehicles 114a . . . 114n (i.e., control hardware 119a . . . 119n internal to vehicles 114a . . . 114n vehicles) and control apparatus 14 may each comprise a specialized hardware device comprising specialized (non-generic) hardware and circuitry (i.e., specialized discrete non-generic analog, digital, and logic based circuitry) for executing a process described with respect to FIGS. 1-3. The specialized discrete non-generic analog, digital, and logic based circuitry may include proprietary specially designed components (e.g., a specialized integrated circuit designed for only implementing an automated process for implementing an autonomous inspection improvement process with respect to apparatuses for inspection and generating associated software scripts for executing future autonomous inspection processes). Control apparatus 14 includes a memory system 8, software 17, and control hardware 19 (all sensors and associated control hardware for enabling software 17 to execute a process for coordinating vehicles 114a . . . 114n for implementing an autonomous inspection improvement process with respect to apparatuses for inspection and generating associated software scripts for executing future autonomous inspection processes). Control hardware 119a . . . 119n includes sensors. Sensors may include, inter alia, GPS sensors, video recording devices, audio enabled devices (i.e., including speakers and microphones), optical sensors, weight sensors, automobile interfaces, etc. The memory system 8 may include a single memory system. Alternatively, the memory system may include a plurality of memory systems. Each of vehicles 114*a* . . . 114*n* may comprise any vehicle that does not require a human operator to be located within the vehicles 114*a* . . . 114*n* such as, inter alia, a remote controlled vehicle (e.g., an aircraft flown by a pilot at a ground control station), an autonomously controlled vehicle (e.g., an aircraft controlled based on pre-programmed flight plans which may include an intelligence algorithm that would enable vehicles 114*a* . . . 114*n* to know the aircraft's location and self-determine an item delivery route), a pre-programmed vehicle, etc. Alternatively, vehicles 114*a* . . . 114*n* may comprise any type of vehicle that includes a human operator located within the vehicle (e.g., an aircraft, an automobile, a boat or ship, a train, etc.). Vehicles 114*a* . . . 114*n* may include, inter alia, an aerial vehicle, a land based vehicle, a marine (water) based vehicle, etc.

System 100 of FIG. 1 enables inspection drills (for an apparatus or vehicle such as an automobile) with respect to the following associated actions:

1. Ignition-off-autonomous actions enabled to be performed when a vehicle ignition switch is disabled and a technician's help is not required. For example, during a vehicle exterior inspection drill, a process is performed for determining if headlights and turn signals are not physically damaged.

2. Ignition-off-supported actions enabled to be performed in combination with a technician's help when a vehicle ignition switch is disabled. For example, during a vehicle exterior inspection drill, a process is performed for determining if a door handle is functional.

3. Ignition-on-standing (semi-autonomous) actions enabled to be performed in combination with a technician's help when a vehicle ignition switch is enabled. For example, during a vehicle exterior inspection drill, a process is performed for determining if headlights and turn signals are functional.

4. Ignition-on-moving actions enabled to be performed in combination with a technician's help when a vehicle ignition switch is enabled and the technician is driving/controlling the vehicle. For example, during a vehicle inspection drill, a process is performed for detecting pollution control issues, vehicle shaking issues, vehicle noise issues, fluid leak issues, doors and trunk lock issues, cooling/heating issues, etc.

5. Electronic control unit (ECU) log-capture actions enabled to be performed in a specified sequence by an ECU capturing ECU logs for analysis with respect to a cloud/centralized application system (CAS) such as control apparatus 14 on FIG. 1 web/ftp directory. For example, an exterior inspection drill may execute the following inspection process sequence:

A. A body paint and dent detection process.
B. A headlights, turn signal light, fender, windscreen, bumper, roof, and door damages detection process.
C. A door alignment and handle functionality detection process.
D. A headlights, turn signal light, convertible roof, and window functionality detection process associated with a technician enabling the process from inside the vehicle.

The following implementation example describes a process for autonomously inspecting (via an inspection vehicle) an automobile as follows:

The process is initiated when an automobile owner arrives at a networked repair shop for an inspection of the automobile. In response, a technician and associated control (inspection) vehicle are assigned for the inspection process. If the control vehicle includes installed X-ray hardware, the automobile is scanned via the X-ray hardware. Alternatively, the automobile is placed within a scanning structure for an internal structural inspection of the automobile. The scanning structure may include an X-ray generator (i.e., generating a high energy X-ray beam) and a highly sensitive U-shaped detector. Captured X-Ray images (from the internal structural inspection) are synchronized with CAS. The captured X-Ray images are analyzed such that the following issues are identified:

1. Missing or additional components within the automobile.
2. Major internal structural issues temporarily repaired such as, inter alia, a broken bumper temporarily fixed and painted.
3. Major/minor front end alignment and/or positional issues.
4. Any unusual or suspicious object or material located anywhere within the automobile.

Additionally, the automobile may be lifted via usage of an automobile lift. In response, the technician signals the control vehicle to execute exterior and interior inspection actions (e.g., ignition-off-autonomous inspections as described, supra) with respect to the automobile. If the control vehicle is unable to safely enter an interior portion of the automobile for execution of the interior inspection, ignition-off-supported actions may be executed. Upon completion of the aforementioned actions, system 100 transmits captured images (i.e., associated with the aforementioned inspection process) to the CAS. In response, the CAS compares and analyzes the previously retrieved X-ray images and the aforementioned captured images with respect to images within a stored database. The analysis process enables system 100 to automatically detect the following details associated with the automobile being inspected:

1. A vehicle identification number (VIN), vehicle type, vehicle model, vehicle variation, and vehicle year.
2. 360-degree vehicle exterior details associated with paint, headlights, exhaust system components, fenders, dents, windscreens, bumper, roof, doors, etc.
3. Vehicle interior details associated with seats, dashboard display readings, floor mats, etc.
4. Suspected damaged parts or components requiring further inspection. For example, after analyzing a bottom image of the automobile, the CAS detects a possible broken exhaust pipe requiring further inspection for confirmation.
5. A suspected theft pattern. For example, if a VIN has been tampered with or is missing, it may be determined that the vehicle has been stolen.

Based on the aforementioned detected details, the CAS identifies specified drills associated with a model of the automobile. A specified drill is defined herein as a repetitive action for perfecting a procedure comprising an action sequence associated with an automobile inspection or repair. The specified drill is transmitted to the inspection vehicle for execution. Additionally, the technician receives (e.g., via a smartphone application) an associated step-by-step script comprising images and video links associated with all activities of the specified drill. A health status of an EMU of the automobile may be captured and with the thereby resulting in a reduced number of drills or actions.

The inspection vehicle is configured to execute ignition-off-supported, ignition-on-standing, and ignition-on-moving actions with respect to the aforementioned actions associated with the exterior and interior drills. Additionally, an action sequence for further drills may be executed. For example, an under the hood inspection drill, a wheel assembly inspection drill, an engine, transmission, axle, and exhaust system drill, etc. All drills and actions are executed in combination by the inspection vehicle and the technician and all captured images and video files are transmitted to the CAS for further analysis.

When all inspection drills have been completed and shared with the CAS, associated data is analyzed to automatically: identify vulnerabilities of the automobile; estimate a cost of repair or maintenance (of the automobile) to remove the vulnerabilities; determine a resale value of the inspected vehicle based on an associated physical and/or mechanical condition; and determine a means to improve a vehicle's resale value with minimum repair and maintenance performed. A final inspection report comprising the aforementioned actions and processes may be generated and a user interface may retrieve feedback (from an owner of the automobile) associated with the final report.

The inspection vehicle may further execute an observe-and-evaluate process comprising recording all technician activities associated with each drill. All determined deviations are shared via communication devices for further improvement. The recording process may include monitoring and recording the technician's activities, positions, and inputs via specialized sensors for creating new inspection and repair drills for generating new self learning software code for the CAS.

Figure 2:
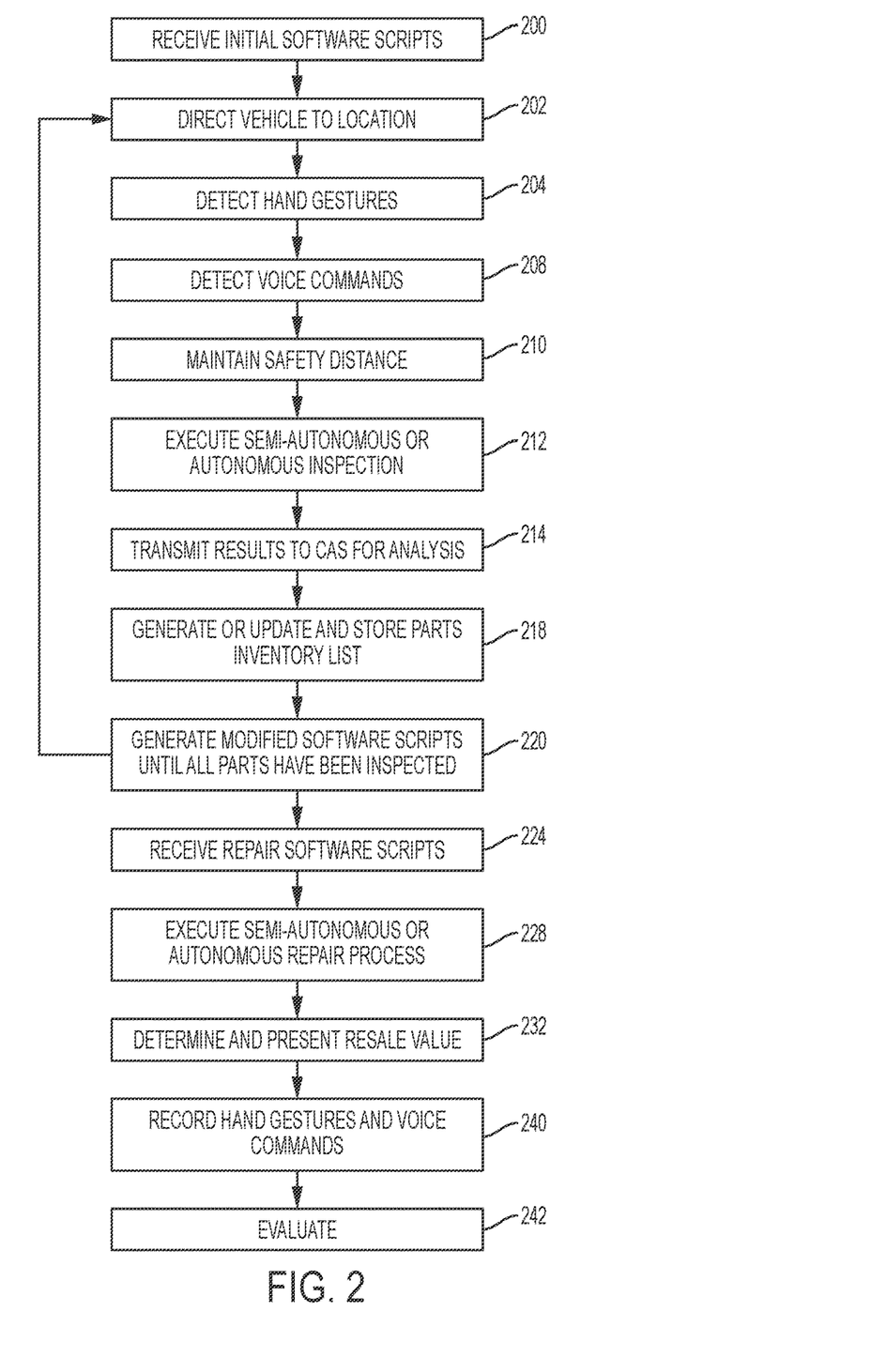
FIG. 2 illustrates an algorithm detailing a process flow enabled by the system of FIG. 1 for implementing an autonomous inspection improvement process with respect to apparatuses for inspection and generating associated software scripts for executing future autonomous inspection processes, in accordance with embodiments of the present invention.

FIG. 2 illustrates an algorithm detailing a process flow enabled by system 100 of FIG. 1 for implementing an autonomous inspection improvement process with respect to apparatuses for inspection and generating associated software scripts for executing future autonomous inspection processes, in accordance with embodiments of the present invention. Each of the steps in the algorithm of FIG. 2 may be enabled and executed in any order by a computer processor(s) or any type of specialized hardware (e.g., CAS) executing computer code. In step 200 a processor of a vehicle receives an initial set of software scripts for executing an autonomous inspection process with respect to an apparatus (e.g., an automobile) for inspection. The vehicle may include any type of sensors (e.g., an X-ray generator and detector, a fire, smoke, and gas detector, an infrared sensor, a motion detector, a temperature sensor, etc.) for performing the autonomous inspection process. In step 202, the vehicle is directed to a specified geographical location associated with the apparatus for inspection. The vehicle includes a video retrieval device for retrieving video data and an audio enabled device for retrieving and presenting audible signals. In step 204, hand gesture commands of an individual (e.g., a technician) associated with inspecting the apparatus are detected via the video retrieval device. In step 208, voice commands of the individual are detected via the audio enabled device. In step 210, a specified safety distance between the vehicle and the individual is maintained. In step 212, a semi-autonomous or autonomous inspection process with respect to the apparatus is executed in response to the hand gesture commands and the voice commands via execution of the initial set of software scripts. The semi-autonomous or autonomous inspection process may include inspecting (via the inspection vehicle or technician) exterior portions of an automobile, interior portions of an automobile, and electro/mechanical portions of an automobile. Additionally, the semi-autonomous or autonomous inspection process may be performed in combination with the individual for performing autonomous actions, semi-autonomous actions, and dependent actions while the apparatus is enabled or disabled. In step 214, results of the semi-autonomous or autonomous inspection process are transmitted to a CAS system for analysis. In step 218, a parts inventory list associated with electro/mechanical parts of the apparatus is generated or modified and stored (via CAS the system) based on results of step 214. The parts inventory list may be analyzed for: additional or missing parts of the apparatus, potential damage parts of the apparatus, parts of the apparatus requiring repair, and parts of the apparatus suspected of malfunctioning. In step 220, a modified set of software scripts for executing future autonomous inspection processes with respect to additional apparatuses for inspection is generated and step 202 is repeated until all parts of the parts inventory list have been inspected. In step 224, a set of repair based software scripts for executing an autonomous or semi-autonomous repair process with respect to the apparatus for inspection is received by the inspection vehicle. In step 228, an associated semi-autonomous or autonomous repair process with respect to systems of the apparatus is performed based on the set of repair based software scripts received in step 224. In step 232, resale value of the apparatus is determined based on results of the semi-autonomous or autonomous inspection process. The resale value may be calculated as follows: TMP+CAP−CMP−TD−SD. TMP is defined as today's market price for a same apparatus (e.g., automobile) model. CAP is defined as a cost for additional parts or equipment associated with the apparatus. CMP is defined as a cost for missing parts of the apparatus. TD is defined as a total damage associated with the apparatus. SD is defined as a standard depreciation rate for a specified country or region. TD is defined as a total damage. The TD is calculated as follows: TRN+TPR+THD. TRN a total repair need. TPR is defined as total part replacement needs. THD is defined as a total health degradation.

In step 240, the hand gesture commands and voice commands of the individual are recorded. In step 242, the technician is analyzed with respect to the modified set of software scripts to determine an alignment between the technician and the modified set of software scripts for said executing future semi-autonomous or autonomous inspection processes.

Figure 3:
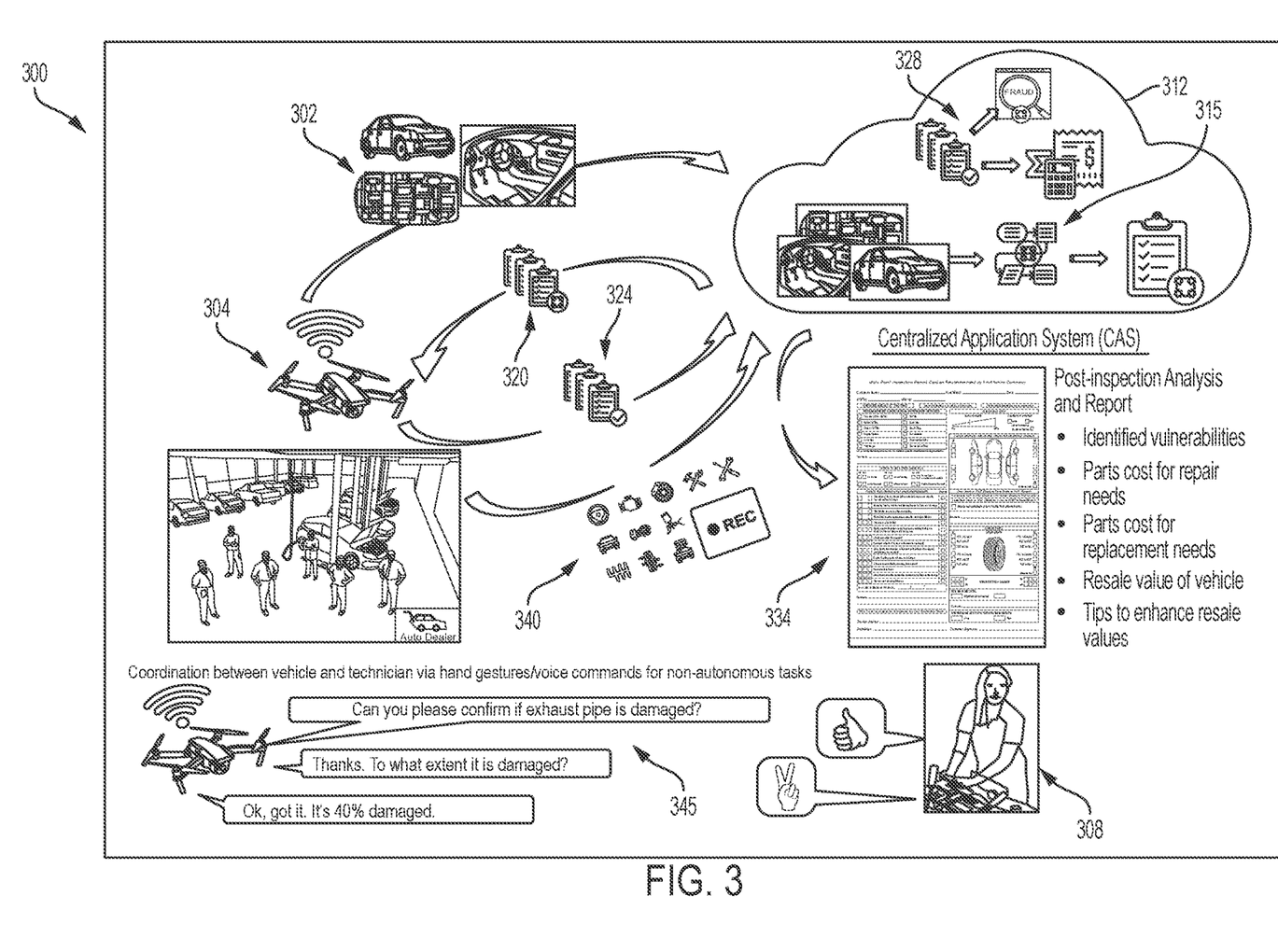
FIG. 3 illustrates a process flow for executing an inspection process with respect to an automobile, in accordance with embodiments of the present invention.

FIG. 3 illustrates a process flow 300 for executing an inspection process with respect to an automobile 302, in accordance with embodiments of the present invention. The inspection process is executed via an inspection vehicle 304 in combination with a technician 308. Inspection vehicle 304 comprises integrated components including a camera, a speaker, Wi-Fi, sensors, a CPU, an X-ray apparatus, and specialized memory for capturing images during an autonomous exterior and interior vehicle inspection process. The captured images in combination with captured x-ray images are shared with a CAS 312 for analysis. In response, a parts inventory list 315 (for the automobile) is generated by comparing and analysing the aforementioned input images with respect to already stored standard images for a make and model associated with automobile 302. The parts inventory list 315 may include information describing potentially damaged parts in need of repair. The CAS 312 is configured to identify necessary inspection actions via analysis of the parts inventory list for generation of a next set of inspection drill scripts (IDSs) 320 comprising specific set of digitally implemented actions. The IDSs 320 are subsequently transmitted to inspection vehicle 304. In response to execution of the IDSs 320, inspection vehicle 304 executes a vehicle inspection process in combination with technician 308 via usage of shared IDSs (i.e., comprising multiple actions, such as autonomous, semi-autonomous, dependent, etc.). Inspection vehicle 304 captures results of IDS 320 execution the form of inspection result scripts (IRS) 324 and the IRS 324 are synchronized with the CAS 312. In response, the CAS verifies and analyzes the received IRS data (e.g., images, sensor data, technician inputs, etc.) prior to updating the parts inventory list 328 with the IRS data associated with vulnerabilities and/or repair and replacement needs. Additionally, the CAS 312 calculates an associated resale value for the automobile via usage of the updated parts inventory list. Likewise, a post inspection report 334 is generated. The post inspection report 334 includes differing types of desired analytics and actionable insights in order to enable users to evaluate the automobile 302. Additionally, inspection vehicle 304 is capable of executing an observe and record mode 340 to capture technician ground activities 345 for transmission to CAS 312 for verification and approval for subsequent updated IDS generation.

Figure 4:
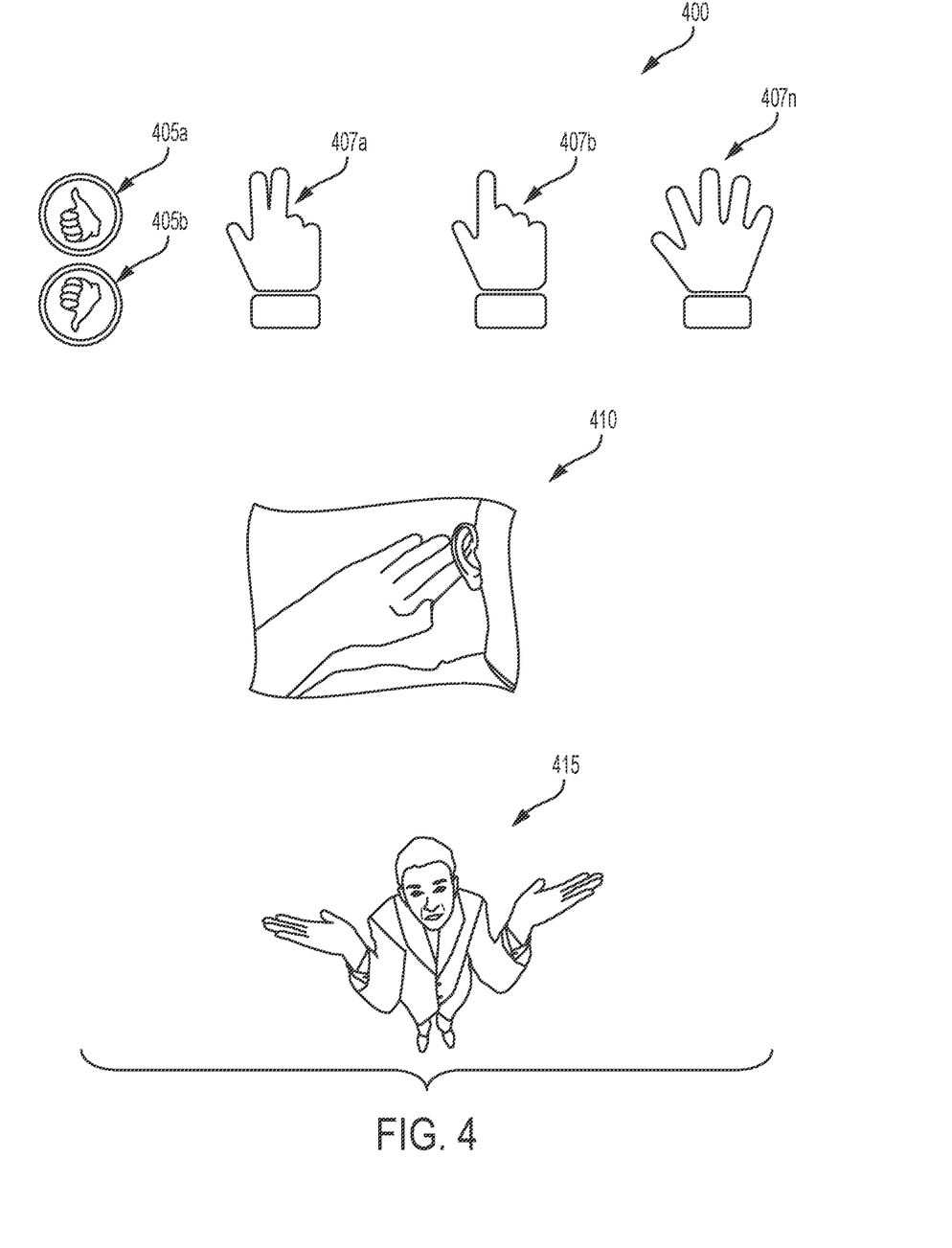
FIG. 4 illustrates a view of a technician supported process for executing the observe and record mode of FIG. 3, in accordance with embodiments of the present invention.

FIG. 4 illustrates a view of a technician supported process 400 for executing observe and record mode 340 of FIG. 3, in accordance with embodiments of the present invention. Technician supported process 400 enables communications between an inspection vehicle (e.g., vehicles 114a . . . 114n of FIG. 1) and a technician performing an inspection process (e.g., in a semiautonomous mode) with respect to an apparatus (e.g., an automobile). An inspection vehicle may instruct (e.g., via a speaker system of the inspection vehicle) a technician to perform a task and request voice command or hand signal confirmations. For example, an inspection vehicle may ask a technician to confirm if an exhaust pipe is broken with thumbs up confirmation 405a for yes and a thumbs down confirmation 405b for no. If the technician signals a thumbs up confirmation 405a, the inspection vehicle may further request that the technician perform an additional hand signal to specify an extent of damage for the broken exhaust pipe. In this instance the technician may enable a signal 407 (comprising differing finger motions 407a . . . 407n) specifying 40% damage to the exhaust pipe. Additionally, the inspection vehicle may automatically capture an image of damaged exhaust pipe before requesting that the technician perform a next task. If the technician is unable to understand a request from the inspection vehicle, the technician may enable a signal by vocally indicating a "Please repeat" command or via an ear signaling command 410. If the technician is unable to perform the task for a specified apparatus model, he/she may execute a hand signal 415. The inspection vehicle may share a video link with a technician's phone or via a projected screen apparatus. If the technician loses communications with the inspection vehicle, he/she may initialize voice commands or hand signals and the inspection vehicle may record the technician via a video message and upload the video message to the CAS for confirmation. In response, the CAS administrator may accept or reject the commands issued via the video message thereby self-learning technician commands and signals.

Figure 5:
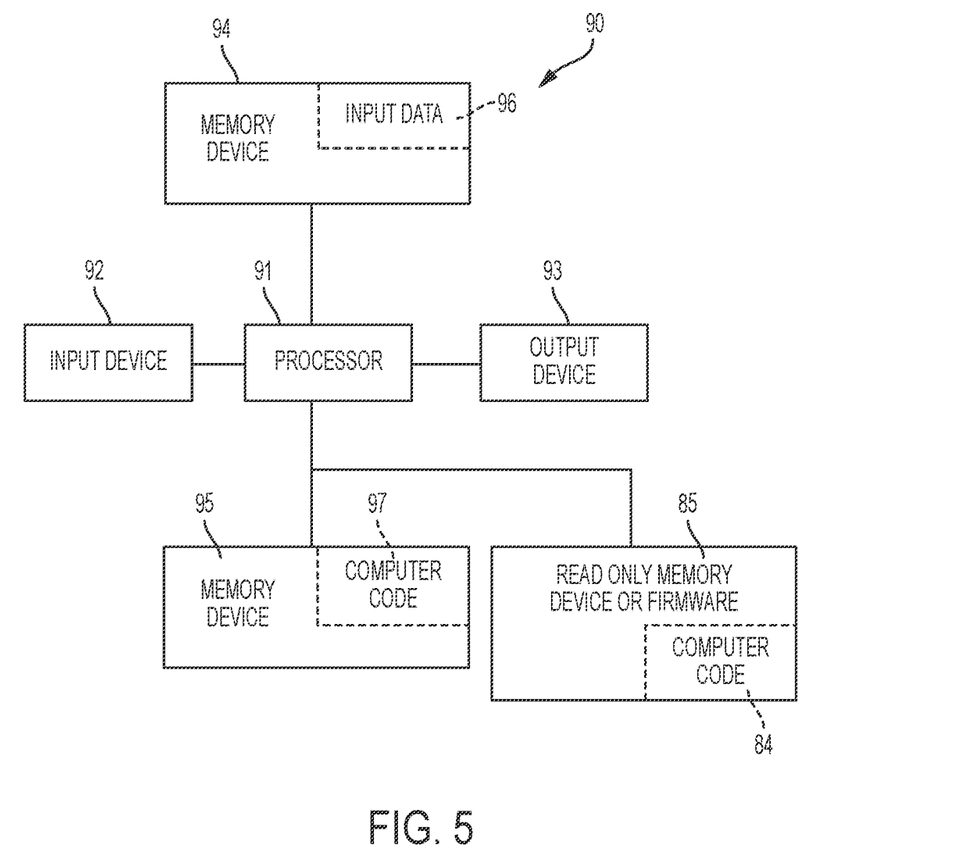
FIG. 5 illustrates a computer system used by the system of FIG. 1 for enabling a process for implementing an autonomous inspection improvement process with respect to apparatuses for inspection and generating associated software scripts for executing future autonomous inspection processes, in accordance with embodiments of the present invention.

FIG. 5 illustrates a computer system 90 (e.g., control hardware 119a . . . 119n internal to vehicles 114a . . . 114n and control apparatus 14) used by or comprised by the system of FIG. 1 for enabling a process for implementing an autonomous inspection improvement process with respect to apparatuses for inspection and generating associated software scripts for executing future autonomous inspection processes, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for enabling a process for implementing an autonomous inspection improvement process with respect to apparatuses for inspection and generating associated software scripts for executing future autonomous inspection processes. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithm) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for implementing an autonomous inspection improvement process with respect to apparatuses for inspection and generating associated software scripts for executing future autonomous inspection processes. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for implementing an autonomous inspection improvement process with respect to apparatuses for inspection and generating associated software scripts for executing future autonomous inspection processes. In another embodiment, the invention provides a business method that performs the process steps of the invention on a subscription, advertising, and/or fee basis. That is, a service supplier, such as a Solution Integrator, could offer to enable a process for enabling a process for implementing an autonomous inspection improvement process with respect to apparatuses for inspection and generating associated software scripts for executing future autonomous inspection processes. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
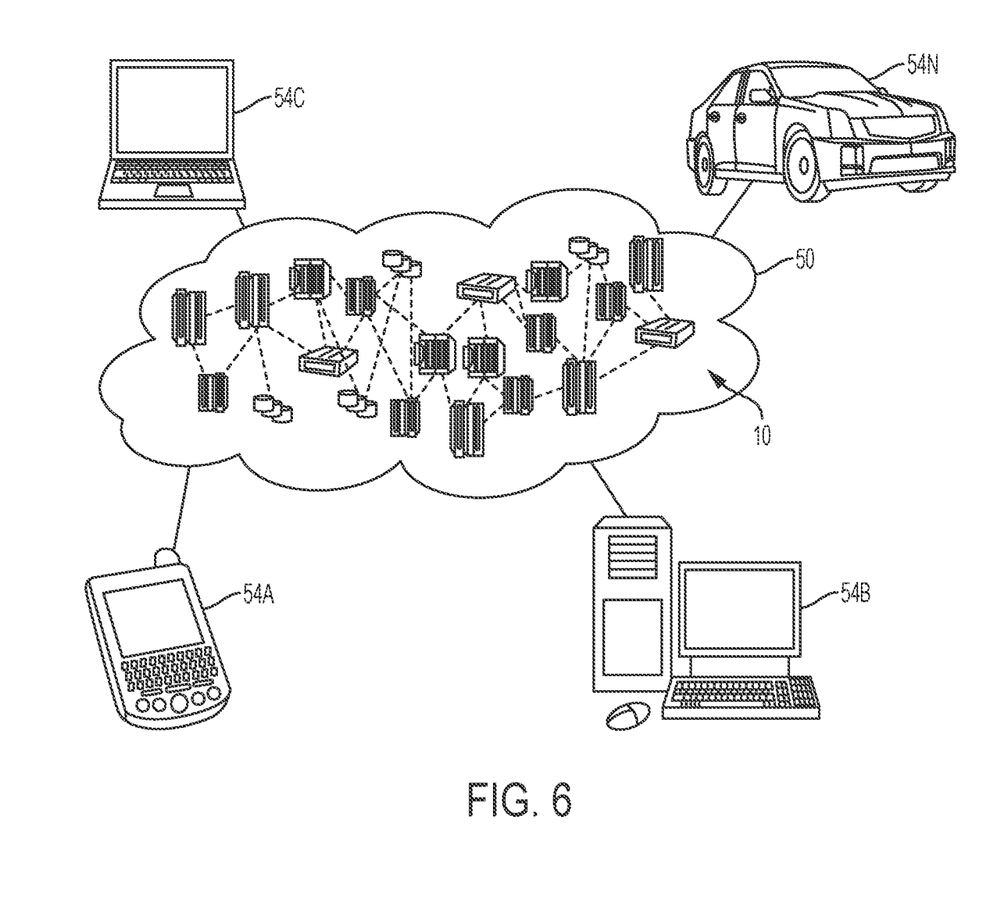
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 4 are intended to be illustrative only and that computing nodes 10 and cloud computing environment 50 can communicate with any type of computerized device over any type of network and/or network addressable connection (e.g., using a web browser).

Figure 7:
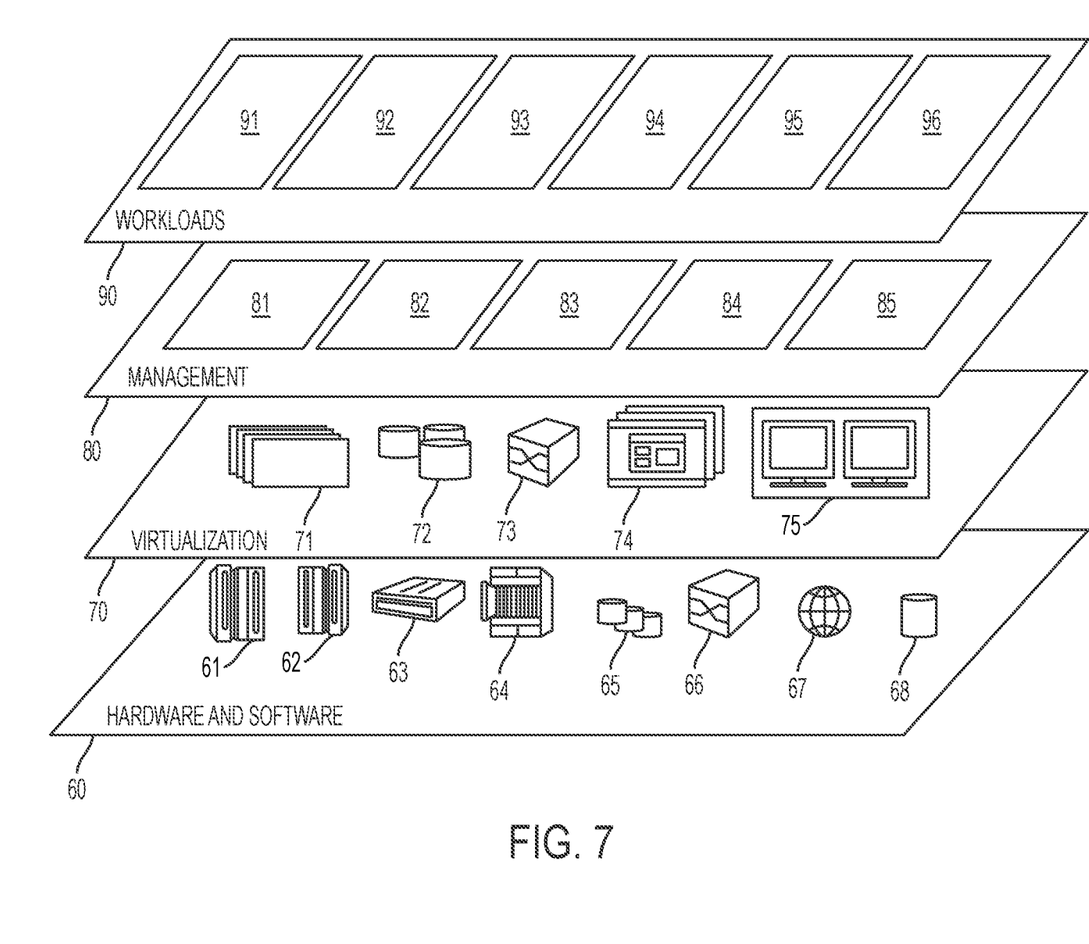
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for implementing an autonomous inspection improvement process with respect to apparatuses for inspection and generating associated software scripts for executing future autonomous inspection processes.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A vehicular implemented inspection improvement method comprising:
   receiving, by a processor of a vehicle, an initial set of software scripts for executing an autonomous inspection process with respect to an apparatus for inspection;
   directing, by said processor, said vehicle to a specified geographical location associated with said apparatus for inspection, wherein said vehicle comprises a video retrieval device for retrieving video data and an audio enabled device for retrieving and presenting audible signals;
   first detecting, by said processor via said video retrieval device, hand gesture commands of an individual associated with inspecting said apparatus for inspection;
   second detecting, by said processor via said audio enabled device, voice commands of said individual associated with inspecting said apparatus for inspection;
   maintaining, by said processor, a specified distance between said vehicle and said individual;
   executing in response to said hand gesture commands and said voice commands, by said processor executing said initial set of software scripts, said autonomous inspection process with respect to said apparatus for inspection;
   generating, by said processor based on said results of said executing said autonomous inspection process, a parts inventory list associated with electro/mechanical parts of said apparatus;
   storing, by said processor within a memory unit of a remote database system, said parts inventory list; and
   generating, by said processor based on results of said executing, a modified set of software scripts for executing future autonomous inspection processes with respect to additional apparatuses for inspection, wherein said generating said modified set of software scripts comprises:
      analyzing, said parts inventory list for additional or missing parts of said apparatus, potential damage parts of said apparatus, parts of said apparatus requiring repair, and part of said apparatus suspected of malfunctioning; and
      performing said generating said modified set of software scripts based on results of said analyzing.

2. The method of claim 1, wherein said apparatus comprises an automobile for inspection, and wherein said autonomous inspection process comprises inspecting exterior portions of said automobile, interior portions of said automobile, and electro/mechanical portions of said automobile.

3. The method of claim 1, wherein said vehicle further comprises sensors for performing said autonomous inspection process, said sensors selected from the group consisting of an X-ray generator and detector; a fire, smoke and gas detector; an infrared sensor; a motion detector; and a temperature sensor.

4. The method of claim 1, wherein said apparatus comprises an automobile for inspection, wherein said executing said autonomous inspection process results in performing autonomous actions, semi-autonomous actions, and dependent actions based on feedback from said individual, and wherein said performing said autonomous actions, said semi-autonomous actions, and said dependent actions comprises:
   performing ignition off autonomous actions, by said processor, associated with actions performed while an ignition of said automobile is in a disabled state;
   performing ignition off individual supported actions, by said processor and said individual, associated with actions performed while said ignition of said automobile is in said disabled state;
   performing ignition on standing actions, by said processor and said individual, associated with actions performed while an ignition of said automobile is in an enabled state and said vehicle is not in motion;

performing ignition on moving actions, by said processor and said individual, associated with actions performed while an ignition of said automobile is in an enabled state and said vehicle is in motion; and performing electronic control unit log capture actions, by said processor, associated with recording a performance of said electronic control unit.

5. The method of claim 1, wherein said apparatus comprises an automobile for inspection, and wherein said method further comprises:

determining, by said processor based on results of said executing said autonomous inspection process, a resale value of said automobile.

6. The method of claim 1, further comprising:

recording, by said processor via said video retrieval device and said audio enabled device, said hand gesture commands and said voice commands of said individual, wherein said generating said modified set of software scripts is further based on analysis of said recording.

7. The method of claim 6, further comprising:

evaluating, by said processor based on said analysis of said recording, said individual with respect to said modified set of software scripts to determine an alignment of said hand gesture commands and said voice commands between said individual and said modified set of software scripts for said executing said future autonomous inspection processes.

8. The method of claim 1, further comprising:

providing at least one support service for at least one of creating, integrating, hosting, maintaining, and deploying computer-readable code in the control hardware, said code being executed by the processor to implement: said receiving, said directing, said first detecting, said second detecting, said maintaining, said executing, and said generating.

9. A computer program product, comprising a computer readable hardware storage device storing a computer readable program code, said computer readable program code comprising an algorithm that when executed by a processor of a vehicle implements a vehicular inspection improvement method, said method comprising:

receiving, by said processor, an initial set of software scripts for executing an autonomous inspection process with respect to an apparatus for inspection;

directing, by said processor, said vehicle to a specified geographical location associated with said apparatus for inspection, wherein said vehicle comprises a video retrieval device for retrieving video data and an audio enabled device for retrieving and presenting audible signals;

first detecting, by said processor via said video retrieval device, hand gesture commands of an individual associated with inspecting said apparatus for inspection;

second detecting, by said processor via said audio enabled device, voice commands of said individual associated with inspecting said apparatus for inspection;

maintaining, by said processor, a specified distance between said vehicle and said individual;

executing in response to said hand gesture commands and said voice commands, by said processor executing said initial set of software scripts, said autonomous inspection process with respect to said apparatus for inspection;

generating, by said processor based on said results of said executing said autonomous inspection process, a parts inventory list associated with electro/mechanical parts of said apparatus;

storing, by said processor within a memory unit of a remote database system, said parts inventory list; and generating, by said processor based on results of said executing, a modified set of software scripts for executing future autonomous inspection processes with respect to additional apparatuses for inspection, wherein said generating said modified set of software scripts comprises:

analyzing, said parts inventory list for additional or missing parts of said apparatus, potential damage parts of said apparatus, parts of said apparatus requiring repair, and part of said apparatus suspected of malfunctioning; and performing said generating said modified set of software scripts based on results of said analyzing.

10. The computer program product of claim 9, wherein said apparatus comprises an automobile for inspection, and wherein said autonomous inspection process comprises inspecting exterior portions of said automobile, interior portions of said automobile, and electro/mechanical portions of said automobile.

11. The computer program product of claim 9, wherein said vehicle further comprises sensors selected from the group consisting of an X-ray generator and detector, a fire, smoke and gas detector, an infrared sensor, a motion detector, and a temperature sensor for performing said autonomous inspection process.

12. The computer program product of claim 9, wherein said apparatus comprises an automobile for inspection, wherein said executing said autonomous inspection process results in performing autonomous actions, semi-autonomous actions, and dependent actions based on feedback from said individual, and wherein said performing said autonomous actions, said semi-autonomous actions, and said dependent actions comprises:

performing ignition off autonomous actions, by said processor, associated with actions performed while an ignition of said automobile is in a disabled state;

performing ignition off individual supported actions, by said processor and said individual, associated with actions performed while said ignition of said automobile is in said disabled state;

performing ignition on standing actions, by said processor and said individual, associated with actions performed while an ignition of said automobile is in an enabled state and said vehicle is not in motion;

performing ignition on moving actions, by said processor and said individual, associated with actions performed while an ignition of said automobile is in an enabled state and said vehicle is in motion; and performing electronic control unit log capture actions, by said processor, associated with recording a performance of said electronic control unit.

13. The computer program product of claim 9, wherein said apparatus comprises an automobile for inspection, and wherein said method further comprises:

determining, by said processor based on results of said executing said autonomous inspection process, a resale value of said automobile.

14. A vehicle comprising a processor coupled to a computer-readable memory unit, said memory unit comprising instructions that when executed by the processor executes a vehicular implemented inspection improvement method comprising:

receiving, by said processor, an initial set of software scripts for executing an autonomous inspection process with respect to an apparatus for inspection;

directing, by said processor, said vehicle to a specified geographical location associated with said apparatus for inspection, wherein said vehicle comprises a video retrieval device for retrieving video data and an audio enabled device for retrieving and presenting audible signals;

first detecting, by said processor via said video retrieval device, hand gesture commands of an individual associated with inspecting said apparatus for inspection;

second detecting, by said processor via said audio enabled device, voice commands of said individual associated with inspecting said apparatus for inspection;

maintaining, by said processor, a specified distance between said vehicle and said individual;

executing in response to said hand gesture commands and said voice commands, by said processor executing said initial set of software scripts, said autonomous inspection process with respect to said apparatus for inspection;

generating, by said processor based on said results of said executing said autonomous inspection process, a parts inventory list associated with electro/mechanical parts of said apparatus;

storing, by said processor within a memory unit of a remote database system, said parts inventory list; and     generating, by said processor based on results of said executing, a modified set of software scripts for executing future autonomous inspection processes with respect to additional apparatuses for inspection, wherein said generating said modified set of software scripts comprises:

analyzing, said parts inventory list for additional or missing parts of said apparatus, potential damage parts of said apparatus, parts of said apparatus requiring repair, and part of said apparatus suspected of malfunctioning; and         performing said generating said modified set of software scripts based on results of said analyzing.

\* \* \* \* \*